(12) United States Patent
Kim et al.

(10) Patent No.: US 8,867,190 B2
(45) Date of Patent: Oct. 21, 2014

(54) MULTILAYER CERAMIC ELECTRONIC COMPONENT HAVING AN AVERAGE SURFACE ROUGHNESS TO PROVIDE ADHESION STRENGTH BETWEEN A DIELECTRIC LAYER AND INNER ELECTRODE AND FABRICATION METHOD THEREOF

(75) Inventors: Jong Han Kim, Gyunggi-do (KR); Hyun Chul Jeong, Gyunggi-do (KR); Jae Man Park, Gyunggi-do (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 364 days.

(21) Appl. No.: 13/333,359

(22) Filed: Dec. 21, 2011

(65) Prior Publication Data
US 2013/0063862 A1    Mar. 14, 2013

(30) Foreign Application Priority Data
Sep. 8, 2011 (KR) .................. 10-2011-0091229

(51) Int. Cl.
*H01G 4/06* (2006.01)
*H01G 4/005* (2006.01)
*H01G 4/30* (2006.01)

(52) U.S. Cl.
CPC . *H01G 4/30* (2013.01); *H01G 4/005* (2013.01)
USPC .................. 361/321.2; 361/303

(58) Field of Classification Search
USPC ............................. 361/303, 321.2
See application file for complete search history.

(56) References Cited

U.S. PATENT DOCUMENTS

| | | | |
|---|---|---|---|
| 6,141,846 A * | 11/2000 | Miki | 29/25.42 |
| 6,320,738 B1 * | 11/2001 | Yamana et al. | 361/321.2 |
| 6,388,865 B1 * | 5/2002 | Honda et al. | 361/311 |
| 6,906,906 B2 * | 6/2005 | Hattori | 361/305 |
| 7,190,016 B2 * | 3/2007 | Cahalen et al. | 257/310 |
| 7,397,649 B2 * | 7/2008 | Muto et al. | 361/321.4 |
| 7,817,402 B2 * | 10/2010 | Miura et al. | 361/305 |
| 2012/0162855 A1* | 6/2012 | Suh et al. | 361/305 |

FOREIGN PATENT DOCUMENTS

| | | |
|---|---|---|
| JP | 07-074047 | 3/1995 |
| JP | 2003-178926 | 6/2003 |
| JP | 2007173714 A * | 7/2007 |

\* cited by examiner

*Primary Examiner* — David M Sinclair
(74) *Attorney, Agent, or Firm* — McDermott Will & Emery LLP (57) ABSTRACT

There is provided a multilayer ceramic electronic component, including: a ceramic main body including a dielectric layer; and inner electrodes disposed to face each other within the ceramic main body, with the dielectric layer interposed therebetween, wherein, when an average thickness of the dielectric layer is td and an average thickness of the inner electrodes is te, 0.1 μm≤te≤0.5 μm and (td+te)/te≤2.5 are satisfied, and when an average surface roughness on a virtual surface roughness center line of the inner electrode is Ra and an average roughness of ten points of the inner electrode is Rz, 5 nm≤Ra≤30 nm, 150 nm≤Rz≤td/2, and 8≤Rz/Ra≤20 are satisfied. The multilayer ceramic electronic component has excellent reliability by improving adhesion strength between the dielectric layer and the inner electrodes and withstand voltage characteristics.

17 Claims, 4 Drawing Sheets

MULTILAYER CERAMIC ELECTRONIC COMPONENT HAVING AN AVERAGE SURFACE ROUGHNESS TO PROVIDE ADHESION STRENGTH BETWEEN A DIELECTRIC LAYER AND INNER ELECTRODE AND FABRICATION METHOD THEREOF

CROSS-REFERENCE TO RELATED APPLICATIONS

This application claims the priority of Korean Patent Application No. 10-2011-0091229 filed on Sep. 8, 2011, in the Korean Intellectual Property Office, the disclosure of which is incorporated herein by reference.

BACKGROUND OF THE INVENTION

1. Field of the Invention

The present invention relates to a multilayer ceramic electronic component having excellent adhesion strength between a dielectric layer and an inner electrode.

2. Description of the Related Art

In accordance with the recent trend toward miniaturization of electronic products, the demand for multilayer ceramic electronic components having a small size and large capacitance has been also increased.

Therefore, dielectric layers and inner electrode layers have been thinned and increasingly multilayered by various methods. Recently, as the dielectric layers have been thinned, multilayer ceramic electronic components having an increased number of lamination layers have been manufactured.

Also, in order to obtain thinner inner electrodes, recently, ceramic electronic components including inner electrodes formed of fine metal powder have been fabricated.

In this case, however, inner electrode surface roughness can be gradually reduced, but adhesion between the dielectric layers and the inner electrodes may be deteriorated.

This may cause delamination of the dielectric layers and the inner electrodes in fabricating multilayer ceramic electronic components, thereby degrading reliability.

SUMMARY OF THE INVENTION

An aspect of the present invention provides a multilayer ceramic electronic component having excellent adhesion strength between a dielectric layer and an inner electrode.

According to an aspect of the present invention, there is provided a multilayer ceramic electronic component including: a ceramic main body including a dielectric layer; and first and second inner electrodes disposed to face each other, within the ceramic main body, with the dielectric layer interposed therebetween, wherein, when an average thickness of the dielectric layer is td and an average thickness of the inner electrodes is te, $0.1\ \mu m \leq te \leq 0.5\ \mu m$ and $(td+te)/te \leq 2.5$ are satisfied, and when an average surface roughness on a virtual surface roughness center line of the inner electrode is Ra and an average roughness of ten points of the inner electrode is Rz, $5\ nm \leq Ra \leq 30\ nm$, $150\ nm \leq Rz \leq td/2$, and $8 \leq Rz/Ra \leq 20$ are satisfied.

The average thickness td of the dielectric layer may satisfy $td \leq 1.5\ \mu m$.

The average thickness td of the dielectric layer may be obtained from a section of the ceramic main body in lengthwise and thicknesswise directions cut in a central portion of the ceramic main body in a widthwise direction.

The average thickness of the inner electrodes may be obtained from a section of the ceramic main body in lengthwise and thicknesswise directions cut in a central portion of the ceramic main body in a widthwise direction.

The inner electrodes may be formed of a metal powder including first particles, and second particles having a particle diameter smaller than that of first particles.

The particle diameter of the first particles may be 1.5 times to 2.5 times greater than that of the second particles.

A content of the first particles may be 9 to 20 weight parts based on 100 weight parts of the metal powder.

According to another aspect of the present invention, there is provided a multilayer ceramic electronic component including a ceramic main body including a dielectric layer, and first and second inner electrodes disposed to face each other with the dielectric layer interposed therebetween, wherein, when an average thickness of the dielectric layer is td and an average thickness of the inner electrodes is te, $td \leq 1.5\ \mu m$ and $0.1\ \mu m \leq te \leq 0.5\ \mu m$ are satisfied, and when an average surface roughness on a virtual surface roughness center line of the inner electrode is Ra and an average surface roughness of ten points of the inner electrode is Rz, $8 \leq Rz/Ra \leq 20$ is satisfied.

The average thickness td of the dielectric layer and the average thickness te of the inner electrodes may satisfy $(td+te)/te \leq 2.5$.

The average surface roughness Rz may satisfy $150\ nm \leq Rz \leq td/2$.

The average thickness of the dielectric layer may be obtained from a section of the ceramic main body in lengthwise and thicknesswise directions cut in a central portion of the ceramic main body in a widthwise direction.

The average thickness of the inner electrodes may be obtained from an average thickness of inner electrodes disposed in a central portion of a section of the ceramic main body in lengthwise and thicknesswise directions cut in a central portion of the ceramic main body in a widthwise direction.

The inner electrodes may be formed of a metal powder including first particles, and second particles having a particle diameter smaller than that of first particles.

The particle diameter of the first particles may be 1.5 times to 2.5 times greater than that of the second particles.

A content of the first particles may be 9 to 20 weight parts based on 100 weight parts of the metal powder.

According to another aspect of the present invention, there is provided a method for fabricating a multilayer ceramic electronic component, including: forming dielectric layers formed of ceramic green sheets including dielectrics; forming inner electrode patterns on the ceramic green sheets by using a metal paste including a metal powder having first particles, and second particles having a particle diameter smaller than that of the first particles, wherein a content of the first particles is 9 to 20 weight parts based on 100 weight parts of the metal powder; and laminating the green sheets with the inner electrode patterns formed thereon and sintering the same to form a ceramic main body, in which an average thickness te of inner electrodes satisfies $0.1\ \mu m \leq te \leq 0.5\ \mu m$, an average surface roughness Ra on a virtual surface roughness center line of the inner electrode satisfies $5\ nm \leq Ra \leq 30\ nm$, and a ratio Rz/Ra of an average surface roughness Rz of ten points of the inner electrode to the average surface roughness Ra satisfies $8 \leq Rz/Ra \leq 20$.

The particle diameter of the first particles may be 1.5 times to 2.5 times greater than that of the second particles.

An average thickness td of the dielectric layers may satisfy $td \leq 1.5\ \mu m$ and $(td+te)/te \leq 2.5$.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

The embodiments of the present invention may be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of components may be exaggerated for clarity, and the same reference numerals will be used throughout to designate the same or like components.

Exemplary embodiments of the present invention will now be described in detail with reference to the accompanying drawings.

Figure 1:
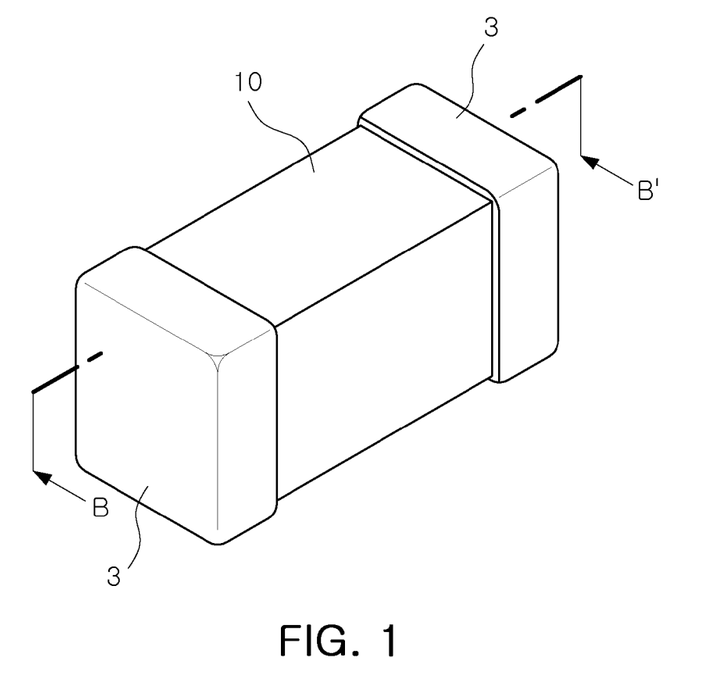
FIG. 1 is a schematic perspective view of a multilayer ceramic capacitor according to an embodiment of the present invention.

FIG. 1 is a schematic perspective view of a multilayer ceramic capacitor (MLCC) according to an embodiment of the present invention.

Figure 2:
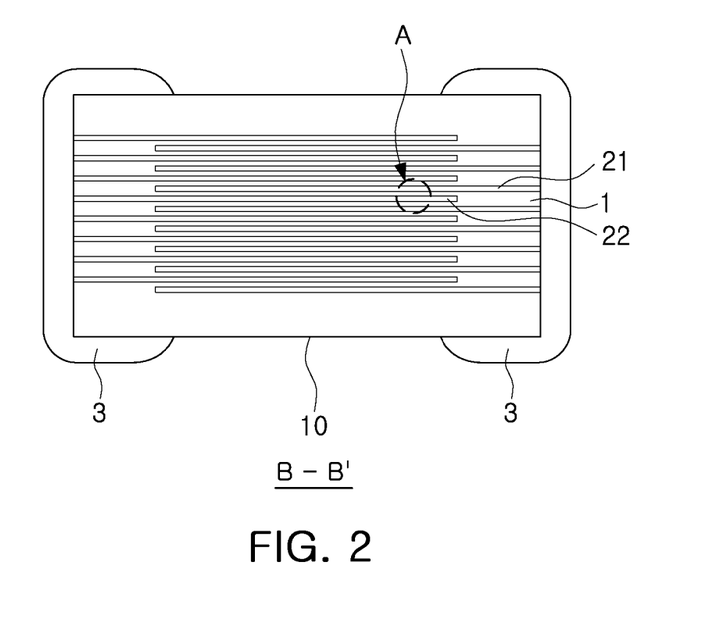
FIG. 2 is a cross-sectional view taken along line B-B' in FIG. 1.

FIG. 2 is a cross-sectional view taken along line B-B' in FIG. 1.

Figure 3:
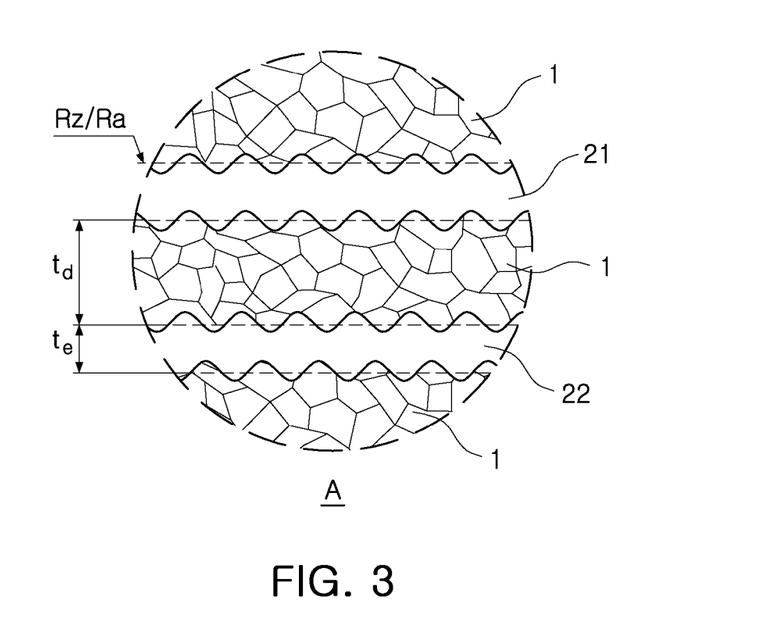
FIG. 3 is an enlarged view showing the thicknesses of inner electrodes and dielectric layers in FIG. 2.

FIG. 3 is an enlarged view showing the thicknesses of inner electrodes and dielectric layers in FIG. 2.

With reference to FIGS. 1 through 3, a multilayer ceramic electronic component according to an embodiment of the present invention includes: a ceramic main body 10 including a dielectric layer 1; and first and second inner electrodes 21 and 22 disposed to face each other with the dielectric layer 1 interposed therebetween within the ceramic main body 10. When an average thickness of the dielectric layer 1 refers to td and an average thickness of the inner electrodes 21 and 22 refers to te, 0.1 $\mu m \leq te \leq 0.5$ $\mu m$ and $(td+te)/te \leq 2.5$ may be satisfied. When an average surface roughness on a virtual surface roughness center line of the inner electrode refers to Ra and an average surface roughness of ten points of the inner electrode refers to Rz, 5 nm $\leq Ra \leq 30$ nm, 150 nm $\leq Rz \leq td/2$, and $8 \leq Rz/Ra \leq 20$ may be satisfied.

Hereinafter, a multilayer ceramic electronic component according to an embodiment of the present invention will be described by taking a multilayer ceramic capacitor (MLCC) as an example, but the invention is not limited thereto.

According to an embodiment of the present invention, a raw material for forming the dielectric layers 1 is not particularly limited so long as it can obtain sufficient capacitance. For example, barium titanate ($BaTiO_3$) may be used.

As for the material of the dielectric layers 1, various materials such as a ceramic additive, an organic solvent, a plasticizer, a bonding agent, a dispersing agent, or the like, may be added to a powder such as barium titanate ($BaTiO_3$), or the like, according to the purpose of the present invention.

An average diameter of ceramic powder particles used to form the dielectric layer 1 is not particularly limited. The average diameter of the ceramic powder particles may be adjusted for achieving the purpose of the present invention, and for example, it may be adjusted to be 400 nm or smaller.

The material of the first and second inner electrodes 21 and 22 is not particularly limited. For example, the first and second inner electrodes 21 and 22 may be formed of a conductive paste including at least one of precious metal, such as palladium (Pd), a palladium-silver (Pd—Ag) alloy, or the like, nickel (Ni), and copper (Cu).

In order to form capacitance, outer electrodes 3 may be formed on outer sides of the ceramic main body 10 and may be electrically connected with the inner electrodes 21 and 22.

The outer electrodes 3 may be formed of the same conductive material as that of the inner electrodes, without being limited thereto. For example, the outer electrodes 3 may be formed of copper (Cu), silver (Ag), nickel (Ni), or the like.

The outer electrodes 3 may be formed by applying a conductive paste obtained by adding glass frit to the metal powder and then firing the same.

With reference to FIGS. 2 and 3, in the MLCC according to the embodiment of the present invention, the average thickness te of the inner electrodes 21 and 22 may be 0.1 $\mu m \leq te \leq 0.5$ $\mu m$.

In the embodiment of the present invention, the average thickness of the inner electrodes 21 and 22 may be measured by scanning an image of a section of the ceramic main body 10 in a lengthwise direction by using a scanning electron microscope (SEM) as shown in FIG. 2.

For example, as shown in FIG. 2, the average thickness of the inner electrode may be obtained by measuring thicknesses at 30 equidistant points of a certain inner electrode in the lengthwise direction, extracted from the image of the section in lengthwise and thicknesswise directions (L-T) cut in a central portion of the ceramic main body 10 in a widthwise direction (W), as captured by the SEM.

The thicknesses at 30 equidistant points may be measured in a capacitance formation portion which refers to an area in which the first and second inner electrodes 21 and 22 overlap each other.

In addition, when this measurement process is extensively performed on ten or more inner electrodes, the average thickness of the inner electrodes may be further generalized.

When the average thickness of the dielectric layer 1 is defined as td, $(td+te)/te \leq 2.5$ may be satisfied.

In the embodiment of the present invention, the average thickness of the dielectric layer 1 may refer to an average thickness of dielectric layers formed between adjacent inner electrodes 21 and 22.

The average thickness of the dielectric layer 1 may be measured by scanning the image of the section of the ceramic main body 10 in the lengthwise direction by using the SEM as shown in FIG. 2.

For example, as shown in FIG. 2, the average thickness of the dielectric layer may be obtained by measuring thicknesses at 30 equidistant points of a certain dielectric layer in the lengthwise direction, extracted from the image of the section in the lengthwise and thicknesswise directions (L-T) cut in the central portion of the ceramic main body 10 in the widthwise direction (W), as captured by the SEM.

The thicknesses at 30 equidistant points may be measured in a capacitance formation portion which refers to an area in which the first and second inner electrodes 21 and 22 overlap each other.

The average thickness td of the dielectric layer 1 may satisfy td≤1.5 μm.

According to the embodiment of the present invention, withstand voltage characteristics can be enhanced by adjusting the average thickness td of the dielectric layers 1 and the average thickness te of the inner electrodes 21 and 22 to satisfy (td+te)/te≤2.5.

When the relational expression (td+te)/te between the average thickness td of the dielectric layer 1 and the average thickness te of the inner electrodes 21 and 22 exceeds 2.5, the thickness of the dielectric layer 1 may be so large that withstand voltage characteristics may not be affected.

Figure 4:
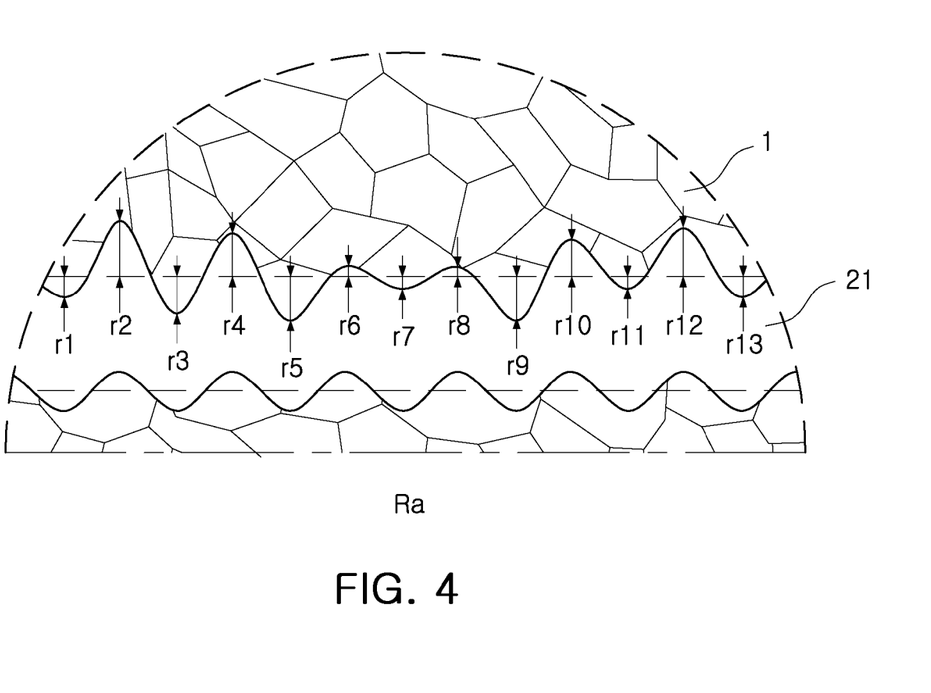
FIG. 4 is a schematic view showing an average surface roughness Ra on a virtual surface roughness center line of the inner electrode in FIG. 3.

FIG. 4 is a schematic view showing an average surface roughness Ra on a virtual surface roughness center line of the inner electrode in FIG. 3.

Figure 5:
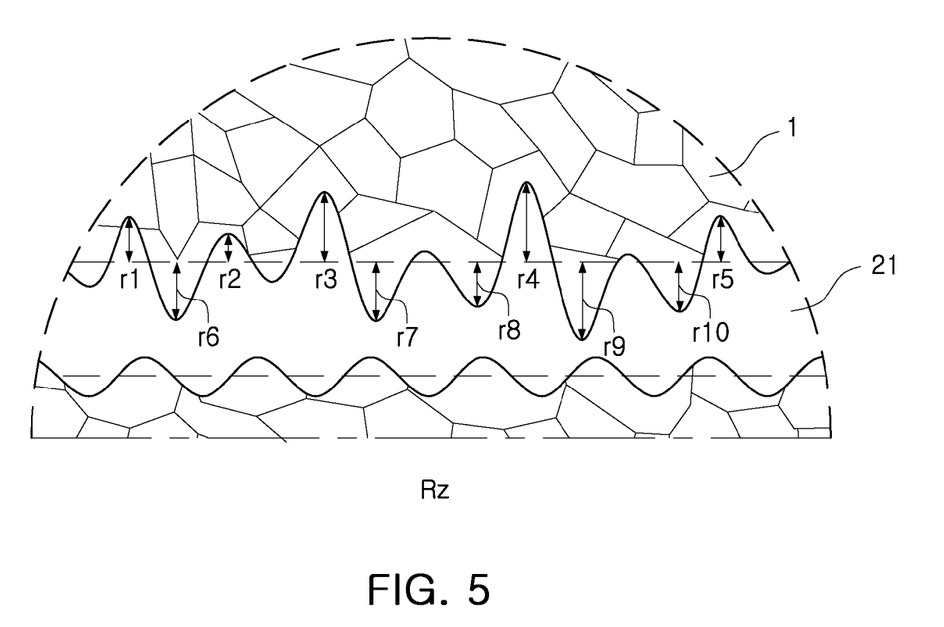
FIG. 5 is a schematic view showing an average surface roughness Rz of ten points of the inner electrode in FIG. 3.

FIG. 5 is a schematic view showing an average surface roughness Rz of ten points of the inner electrode in FIG. 3.

With reference to FIGS. 4 and 5, in the multilayer ceramic capacitor according to the embodiment of the present invention, when the average surface roughness on the virtual surface roughness center line of the inner electrode is Ra and the average surface roughness of ten points of the inner electrode is Rz, 5 nm≤Ra≤30 nm, 150 nm≤Rz≤td/2, and 8≤Rz/Ra≤20 may be satisfied.

The average surface roughness Ra may be obtained by calculating an average value of surface roughness based on a virtual center line of irregularities formed on the inner electrode.

Specifically, with reference to FIG. 4, in order to calculate the average surface roughness Ra, the virtual center line may be drawn with respect to the irregularities formed on one surface of the inner electrode.

Next, respective vertical distances (e.g., $r_1, r_2, r_3 \ldots r_{13}$) based on the virtual center line are measured and an average value thereof is taken as the average surface roughness Ra.

$$Ra = \frac{r_1 + r_2 + r_3 + \ldots r_n}{n}$$

Also, the average surface roughness Rz of ten points of the inner electrode may refer to a value derived by calculating an average value of respective vertical distances by adding respective vertical distances of five highest points above the virtual center line and respective vertical distances of five lowest points below the virtual center line, based on the virtual center line of the irregularities.

Specifically, with reference to FIG. 5, in order to calculate the average surface roughness Rz, the virtual center line may be drawn with respect to the irregularities formed on one surface of the inner electrode.

Next, based on the virtual center line of the irregularities, the respective vertical distances of the five highest points ($r_1+r_2+r_3+r_4+r_5$) above the virtual center line and the respective vertical distances of the five lowest points ($r_6+r_7+r_8+r_9+r_{10}$) below the virtual center line may be measured, and then, the average value of the respective vertical distances may be calculated as represented by the following Equation:

$$Rz = \frac{(r_1 + r_2 + r_3 + r_4 + r_5) + (r_6 + r_7 + r_8 + r_9 + r_{10})}{10}$$

By adjusting the average surface roughness Ra to be within a range of 5 nm≤Ra≤30 nm, a highly reliable multilayer ceramic capacitor having excellent withstand voltage characteristics and enhanced adhesion strength between the dielectric layer and the inner electrodes may be realized.

When the average surface roughness Ra is lower than 5 nm, the adhesion strength between the dielectric layer and the inner electrodes may be degraded to thereby cause delamination. When the average surface roughness Ra exceeds 30 nm, an interval between the inner electrodes 21 and 22 with the thin dielectric layer 1 interposed therebetween may be close, whereby withstand voltage characteristics may be degraded.

Meanwhile, by adjusting the average surface roughness Rz to be within a range of 150 nm≤Rz≤td/2, withstand voltage characteristics and the adhesion strength between the dielectric layer and the inner electrodes may be further enhanced.

When the average surface roughness Rz is lower than 150 nm, the adhesion strength between the dielectric layer and the inner electrodes may be degraded to thereby cause delamination. When the average surface roughness Rz exceeds td/2, a short circuit may be generated between the inner electrodes 21 and 22 and withstand voltage characteristics may be degraded.

Also, by adjusting a ratio (Rz/Ra) of the average surface roughness Rz to the average surface roughness Ra to be within a range of 8≤Rz/Ra≤20, withstand voltage characteristics and the adhesion strength between the dielectric layer and the inner electrodes may be further enhanced.

When a fine metal powder having a small particle diameter is used to form the inner electrodes, the average surface roughness Ra may be reduced and the inner electrodes may be thinned.

However, when only the fine metal powder having a small particle diameter is used, the average surface roughness Ra may be too low, whereby the adhesion strength between the dielectric layer and the inner electrodes may be degraded and delamination may be caused.

When the fine metal powder having a small particle diameter is mixed with a metal powder having a relatively large particle diameter to thereby appropriately increase the average surface roughness Rz, the adhesion strength between the dielectric layer and the inner electrodes may be improved.

In other words, by appropriately adjusting the ratio (Rz/Ra) of the average surface roughness Rz to the average surface roughness Ra, the inner electrodes may be thinned, and withstand voltage characteristics and the adhesion strength between the dielectric layer and the inner electrodes may be further enhanced.

Namely, by adjusting the ratio (Rz/Ra) of the average surface roughness Rz to the average surface roughness Ra to be within a range of 8≤Rz/Ra≤20, the inner electrodes may be thinned, and withstand voltage characteristics and the adhesion strength between the dielectric layer and the inner electrodes may be further enhanced.

When the ratio (Rz/Ra) of the average surface roughness Rz to the average surface roughness Ra is less than 8, the adhesion strength between the dielectric layer and the inner electrodes may be degraded to thereby cause delamination, and when the ratio (Rz/Ra) of the average surface roughness Rz to the average surface roughness Ra exceeds 20, withstand voltage characteristics may be degraded.

Thus, according to the embodiment of the present invention, the average surface roughness Ra on the virtual surface roughness center line of the inner electrode and the average surface roughness Rz of the ten points of the inner electrode are adjusted to satisfy 5 nm≤Ra≤30 nm, 150 nm≤Rz≤td/2, and 8≤Rz/Ra≤20, whereby a large capacity multilayer ceramic electronic component having increased adhesion strength between the dielectric layer and the inner electrodes and enhanced withstand voltage characteristics and reliability may be realized.

In order to adjust the average surface roughness Ra, the average surface roughness Rz, and their ratio to be within the foregoing range, according to the embodiment of the present invention, metal powder used for the inner electrodes 21 and 22 may include first particles, and second particles having a smaller particle diameter than that of the first particles.

Here, the diameter of the first particles may be 1.5 times to 2.5 times greater than that of the second particles.

Namely, in order to make the inner electrodes thinner and improve the withstand voltage characteristics, Ra, Rz, and Rz/Ra are adjusted to be within a certain range, and to this end, metal powder having different particle sizes may be mixedly used in the inner electrodes 21 and 22.

Namely, the powder having different particle sizes may include first particles, and second particles having a smaller diameter than that of the first particles, and here, the diameter of the first particles may be 1.5 times to 2.5 times greater than that of the second particles.

When the diameter of the first particles is less than 1.5 times that of the second particles, the difference in particle diameters is small, and thus, the adhesion strength between the dielectric layer and the inner electrodes may be degraded to thereby cause delamination, and when the diameter of the first particles exceeds 2.5 times that of the second particles, withstand voltage characteristics may be degraded.

The diameter of the metal powder particles is not particularly limited. For example, the diameter of the first particles may be 300 nm or smaller and the diameter of the second particles smaller than that of the first particles may be 200 nm or smaller.

Also, the content of the first particles may be 9 to 20 weight parts based on 100 weight parts of the metal powder.

When the content of the first particles is less than 9 weight parts, since the content of particles having a large particle diameter is low, the adhesion strength between the dielectric layer and the inner electrodes may be degraded to cause delamination, and when the content of the first particles exceeds 20 weight parts, withstand voltage characteristics may be degraded.

Meanwhile, a multilayer ceramic electronic component according to another embodiment of the present invention includes a ceramic main body 10 including a dielectric layer 1, and first and second inner electrodes 21 and 22 disposed to face each other with the dielectric layer 1 interposed therebetween. When an average thickness of the dielectric layer 1 refers to td and an average thickness of the inner electrodes 21 and 22 refers to te, td≤1.5 μm and 0.1 μm≤te≤0.5 μm may be satisfied. When an average surface roughness on a virtual surface roughness center line of the inner electrode refers to Ra and an average surface roughness of ten points of the inner electrode refers to Rz, 8≤Rz/Ra≤20 may be satisfied.

The average thickness td of the dielectric layer 1 and the average thickness te of the inner electrodes 21 and 22 may satisfy (td+te)/te≤2.5.

The average surface roughness Rz may satisfy 150 nm≤Rz≤td/2.

The average thickness of the inner electrodes may be an average thickness of inner electrodes in a central portion of a section of the ceramic main body in lengthwise and thicknesswise directions (L-T) cut in a central portion of the ceramic main body in a widthwise direction (W).

The average thickness of the dielectric layer may be an average thickness of dielectric layers in the central portion of the section of the ceramic main body in the lengthwise and thicknesswise directions (L-T) cut in the central portion of the ceramic main body in the widthwise direction (W).

Also, when the measurement process is extensively performed on 10 or more dielectric layers, the average thickness of the dielectric layers may be further generalized.

In describing the multilayer ceramic electronic component according to another embodiment of the present invention, the same description as that of the MLCC according to the previous embodiment of the present invention will be omitted.

Figure 6:
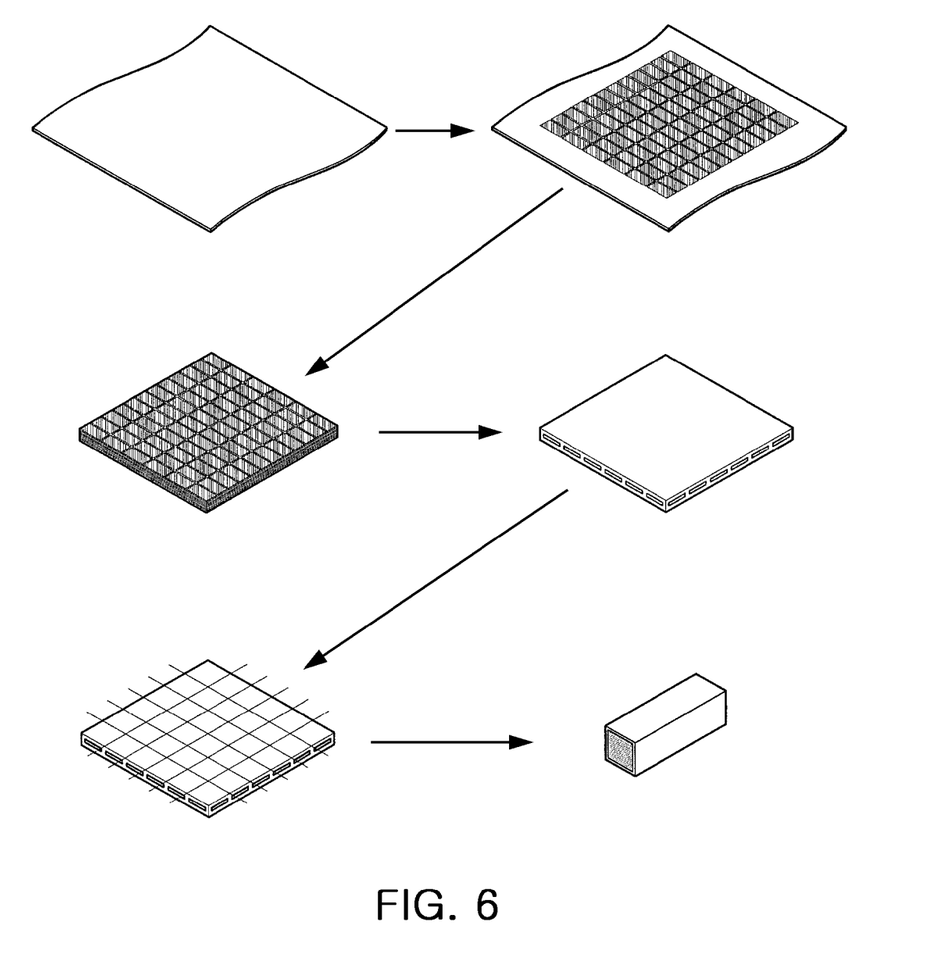
FIG. 6 is a view showing a process of fabricating a multilayer ceramic capacitor according to another embodiment of the present invention.

FIG. 6 is a view showing a process of fabricating a multilayer ceramic capacitor according to another embodiment of the present invention.

With reference to FIG. 6, a method of fabricating a multilayer ceramic electronic component according to another embodiment of the present invention may include: preparing ceramic green sheets including dielectrics; forming inner electrode patterns on the ceramic green sheets by using a metal paste including metal powder having first particles, and second particles having a particle diameter smaller than that of the first particles, wherein the content of the first particles is 9 to 20 weight parts based on 100 weight parts of the metal powder; and laminating the green sheets with the inner electrode pattern formed thereon and sintering the same to form a ceramic main body in which an average thickness te of inner electrodes satisfies 0.1 μm≤te≤0.5 μm, an average surface roughness Ra on a virtual surface roughness center line of the inner electrode satisfies 5 nm≤Ra≤30 nm, and a ratio Rz/Ra of an average surface roughness Rz of ten points of the inner electrode to the average surface roughness Ra satisfies 8≤Rz/Ra≤20.

According to the method of fabricating a multilayer ceramic electronic component according to an embodiment of the present invention, ceramic green sheets including dielectrics may be prepared.

In order to fabricate the ceramic green sheet, a slurry is produced by mixing ceramic powder, a binder, and a solvent, and is then formed as a sheet having a thickness of a few μm through a doctor blade method.

Next, inner electrode patterns may be formed on the ceramic green sheets by using a metal paste including metal powder having first particles, and second particles having a particle diameter smaller than that of the first particles, wherein the content of the first particles is 9 to 20 weight parts based on 100 weight parts of the metal powder.

The particle diameter of the first particles may be 1.5 times to 2.5 times greater than that of the second particles.

Next, the green sheets having the inner electrode patterns formed thereon are laminated and sintered to form a ceramic main body, in which an average thickness te of inner electrodes satisfies 0.1 μm≤te≤0.5 μm, an average surface roughness Ra on a virtual surface roughness center line of the inner electrode satisfies 5 nm≤Ra≤30 nm, and a ratio Rz/Ra of an average surface roughness Rz of ten points of the inner electrode to the average surface roughness Ra satisfies 8≤Rz/Ra≤20.

The average thickness td of the dielectric layer may satisfy td≤1.5 μm and (td+te)/te≤2.5.

The same characteristics as described in the multilayer ceramic electronic component according to the previous embodiment of the present invention will be omitted.

Hereinafter, the present invention will be described in more detail with reference to Examples, but the present invention is not limited thereto.

Tests of examples were performed with respect to the multilayer ceramic capacitor employing the inner electrodes 21 and 22 having an average thickness of 0.1 μm≤te≤0.5 μm, in order to determine whether the reliability thereof was enhanced according to a mixture ratio of the metal particles having different particle diameters used in the inner electrodes 21 and 22, the average surface roughness Ra, the average surface roughness Rz, the ratio (Rz/Ra), and the average thickness td of the dielectric layer.

The multilayer ceramic capacitor was fabricated through the following operations:

First, a slurry including powder having an average particle diameter of 0.1 μm, such as barium titanate ($BaTiO_3$), or the like, was applied to a carrier film and then dried to prepare a plurality of ceramic green sheets, thus forming the dielectric layers 1.

Next, a conductive paste for inner electrodes, in which first nickel particles having an average size of 0.3 μm and second nickel particles having an average size of 0.2 μm were mixed in a weight ratio of 4:1 to 10:1, was prepared.

The conductive paste for inner electrodes was applied to the green sheets by a screen printing method to form inner electrodes, and the resulting structures were then laminated in amounts of 190 to 250 layers to form a laminate.

And then, the laminate was compressed and cut to generate a chip having a 0603 standard size, and the chip was fired at a temperature ranging from 1050° C. to 1200° C. under a reducing atmosphere of $H_2$ of 0.1% or less.

Thereafter, an outer electrode process, a plating process, and the like, were performed to fabricate a multilayer ceramic capacitor.

The observation of the sections of the multilayer ceramic capacitor samples showed that the average thickness of the inner electrodes ranged from 0.10 to 0.50 μm, and the average thickness of the dielectric layer ranged from 0.10 to 0.80 μm.

Table 1 below shows the comparison in breakdown voltage (BDV) according to the average thickness of the inner electrodes 21 and 22, the average thickness of the dielectric layer 1, and the ratio of the sum of the average thickness of the dielectric layer 1 and the average thickness of the inner electrodes 21 and 22 to the average thickness of the inner electrodes 21 and 22.

TABLE 1

| Sample No. | Thickness of dielectric layer (td) (μm) | Thickness of inner electrode (te) (μm) | (td + te)/te | Dielectric breakdown |
|---|---|---|---|---|
| *1 | 0.2 | 0.1 | 3.0 | X |
| 2 | 0.15 | 0.1 | 2.5 | ○ |
| 3 | 0.1 | 0.1 | 2.0 | ○ |
| 4 | 0.05 | 0.1 | 1.5 | ○ |
| 5 | 0.2 | 0.2 | 2.0 | ○ |
| 6 | 0.25 | 0.2 | 2.3 | ○ |
| 7 | 0.3 | 0.2 | 2.5 | ○ |
| *8 | 0.35 | 0.2 | 2.8 | X |
| 9 | 0.2 | 0.3 | 1.7 | ○ |
| 10 | 0.3 | 0.3 | 2.0 | ○ |
| 11 | 0.4 | 0.3 | 2.3 | ○ |
| *12 | 0.5 | 0.3 | 2.7 | X |
| 13 | 0.2 | 0.4 | 1.5 | ○ |
| 14 | 0.3 | 0.4 | 1.8 | ○ |
| 15 | 0.4 | 0.4 | 2.0 | ○ |

TABLE 1-continued

| Sample No. | Thickness of dielectric layer (td) (μm) | Thickness of inner electrode (te) (μm) | (td + te)/te | Dielectric breakdown |
|---|---|---|---|---|
| 16 | 0.5 | 0.4 | 2.3 | ○ |
| 17 | 0.2 | 0.5 | 1.4 | ○ |
| 18 | 0.3 | 0.5 | 1.6 | ○ |
| 19 | 0.4 | 0.5 | 1.8 | ○ |
| 20 | 0.5 | 0.5 | 2.0 | ○ |
| 21 | 0.6 | 0.5 | 2.2 | ○ |
| 22 | 0.7 | 0.5 | 2.4 | ○ |
| *23 | 0.8 | 0.5 | 2.6 | X |

In Table 1, the breakdown voltage BDV was evaluated by applying a DC voltage at a rate of 1.0 Vsec, and a case in which dielectric breakdown occurred was marked by O and a case in which dielectric breakdown did not occur was marked by X based on a breakdown voltage of 60V.

With reference to Table 1, it is noted that when the relationship between the average thickness te of the inner electrodes 21 and 22 and the average thickness td of the dielectric layer 1 satisfied (td+te)/te≤2.5, dielectric breakdown occurred to cause a problem in the reliability test.

Meanwhile, in case of samples 1, 8, 12, and 23 which exceeded the numeral value range of 2.5, no dielectric breakdown occurred owing to the thick dielectric layer, therefore not affecting withstand voltage characteristics.

Thus, it is noted that, in the multilayer ceramic electronic component according to the embodiment of the present invention, withstand voltage characteristics could be enhanced according to the average surface roughness Ra, the average surface roughness Rz, and their ratio Rz/Ra when the relationship between the average thickness te of the inner electrodes 21 and 22 and the average thickness td of the dielectric layer 1 satisfied (td+te)/te≤2.5.

Table 2 below shows the comparison in delamination according to the average surface roughness Ra, the average surface roughness Rz, and their ratio Rz/Ra when the average thicknesses of the inner electrodes 21 and 22 were different.

TABLE 2

| Sample No. | Thickness of inner electrode (te) (μm) | Ra (nm) | Rz (nm) | Rz/Ra | Delamination (○, X) |
|---|---|---|---|---|---|
| *1 | 0.5 | 5 | 30 | 6 | ○ |
| 2 | 0.8 | 5 | 35 | 7 | X |
| 3 | 1.0 | 5 | 40 | 8 | X |

With reference to Table 2, sample 1 shows a case in which the average thickness of the inner electrodes was 0.5 μm. It is noted that when the average surface roughness Ra, the average surface roughness Rz, and their ratio Rz/Ra are outside of the numerical value range of the present invention, delamination occurred, dampening reliability in the test.

Meanwhile, samples 2 and 3 show cases in which the average thickness of the inner electrodes exceeded 0.5 μm. It is noted that even when the average surface roughness Ra, the average surface roughness Rz, and their ratio Rz/Ra are outside of the numerical value range of the present invention, no delamination occurred.

Thus, it is noted that, in the multilayer ceramic electronic component according to the embodiment of the present invention, when the average thickness of the inner electrodes was 0.5 μm or smaller, delamination was reduced and reliability was improved.

Table 3 below shows the comparison in dielectric breakdown and delamination according to the mixture ratio of metal particles having different particle diameters used in the inner electrodes 21 and 22, the average thickness of the inner electrodes 21 and 22, the average thickness of the dielectric layer 1, the ratio of the sum of the average thickness of the dielectric layer 1 and the average thickness of the inner electrodes 21 and 22 to the average thickness of the inner electrodes 21 and 22, the average surface roughness Ra, the average surface roughness Rz, and their ratio Rz/Ra.

TABLE 3

| Sample No. | Mixture Ratio of second particle/ first particle | Thickness of dielectric layer (td) (μm) | Thickness of Inner Electrode layer (te) (μm) | (td + te)/te | Ra (nm) | Rz (nm) | Rz/Ra | BDV (Max. 60 V) Dielectric breakdown | Delamination (○, X) |
|---|---|---|---|---|---|---|---|---|---|
| Comparative Example 1 | 10/1 | 0.15 | 0.1 | 2.5 | 5 | 30 | 6 | ○ | ○ |
| Comparative Example 2 | 8/1 | 0.1 | 0.1 | 2.0 | 5 | 35 | 7 | ○ | ○ |
| Comparative Example 3 | 6/1 | 0.05 | 0.1 | 1.5 | 5 | 40 | 8 | ○ | ○ |
| Comparative Example 4 | 5/1 | 0.2 | 0.2 | 2.0 | 5 | 100 | 20 | ○ | ○ |
| Comparative Example 5 | 4/1 | 0.25 | 0.2 | 2.3 | 8 | 120 | 15 | ○ | ○ |
| Comparative Example 6 | 10/1 | 0.3 | 0.2 | 2.5 | 8 | 144 | 18 | ○ | ○ |
| Example 1 | 8/1 | 0.2 | 0.3 | 1.7 | 8 | 160 | 20 | X | X |
| Example 2 | 6/1 | 0.3 | 0.3 | 2.0 | 15 | 225 | 15 | X | X |
| Example 3 | 5/1 | 0.4 | 0.3 | 2.3 | 15 | 300 | 20 | X | X |
| Example 4 | 4/1 | 0.2 | 0.4 | 1.5 | 20 | 200 | 10 | X | X |
| Example 5 | 10/1 | 0.3 | 0.4 | 1.8 | 20 | 300 | 15 | X | X |
| Example 6 | 8/1 | 0.4 | 0.4 | 2.0 | 20 | 400 | 20 | X | X |
| Comparative Example 7 | 6/1 | 0.5 | 0.4 | 2.3 | 20 | 500 | 25 | ○ | ○ |
| Comparative Example 8 | 5/1 | 0.2 | 0.5 | 1.4 | 25 | 125 | 5 | ○ | ○ |
| Example 7 | 4/1 | 0.3 | 0.5 | 1.6 | 25 | 250 | 10 | X | X |
| Example 8 | 10/1 | 0.4 | 0.5 | 1.8 | 25 | 375 | 15 | X | X |
| Example 9 | 8/1 | 0.5 | 0.5 | 2.0 | 25 | 500 | 20 | X | X |
| Comparative Example 9 | 6/1 | 0.6 | 0.5 | 2.2 | 25 | 625 | 25 | ○ | ○ |
| Example 10 | 5/1 | 0.7 | 0.5 | 2.4 | 30 | 150 | 5 | X | X |
| Example 11 | 4/1 | 0.35 | 0.3 | 2.2 | 30 | 300 | 10 | X | X |
| Example 12 | 6/1 | 0.35 | 0.4 | 1.9 | 30 | 450 | 15 | X | X |
| Example 13 | 10/1 | 0.35 | 0.5 | 1.7 | 30 | 600 | 20 | X | X |
| Comparative Example 10 | 10/1 | 0.45 | 0.4 | 2.1 | 35 | 350 | 10 | ○ | ○ |

As noted in Table 3, in Comparative Examples 1 to 10 in which the average surface roughness Ra, the average surface roughness Rz, and their ratio Rz/Ra are outside of the numerical value range of the present invention, dielectric breakdown occurred at a maximum voltage 60V of the breakdown voltage, and delamination occurred to thereby dampen reliability.

Meanwhile, in Examples 1 to 13 satisfying the numerical value range of the present invention, even when the relationship between the average thickness te of the inner electrodes 21 and 22 and the average thickness td of the dielectric layer 1 satisfied (td+te)/te≤2.5, no dielectric breakdown and no delamination occurred. Thus, it is noted that a multilayer ceramic capacitor having excellent withstand voltage characteristics and reliability could be realized.

As set forth above, according to embodiments of the invention, adhesion strength between a dielectric layer and inner electrodes is improved and withstand voltage characteristics are also improved, such that a large capacity multilayer ceramic electronic component having excellent reliability may be manufactured.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic electronic component comprising:
a ceramic main body including a dielectric layer; and
first and second inner electrodes disposed to face each other, within the ceramic main body, with the dielectric layer interposed therebetween, wherein:
when an average thickness of the dielectric layer is td and an average thickness of the inner electrodes is te, 0.1 μm≤te≤0.5 μm and (td+te)/te≤2.5 are satisfied, and
when an average surface roughness on a virtual surface roughness center line of the inner electrode is Ra and an average roughness of ten points of the inner electrode is Rz, 150 nm≤Rz≤td/2, and 8≤Rz/Ra≤20 are satisfied.

2. The multilayer ceramic electronic component of claim 1, wherein the average thickness td of the dielectric layer satisfies 0.15≤td≤0.75 μm.

3. The multilayer ceramic electronic component of claim 1, wherein the average thickness td of the dielectric layer is obtained from a section of the ceramic main body in lengthwise and thicknesswise directions cut in a central portion of the ceramic main body in a widthwise direction.

4. The multilayer ceramic electronic component of claim 1, wherein the average thickness of the inner electrodes is obtained from a section of the ceramic main body in lengthwise and thicknesswise directions cut in a central portion of the ceramic main body in a widthwise direction.

5. The multilayer ceramic electronic component of claim 1, wherein the inner electrodes are formed of a metal powder including first particles, and second particles having a particle diameter smaller than that of first particles.

6. The multilayer ceramic electronic component of claim 5, wherein the particle diameter of the first particles is 1.5 times to 2.5 times greater than that of the second particles.

7. The multilayer ceramic electronic component of claim 5, wherein a content of the first particles is 9 to 20 weight parts based on 100 weight parts of the metal powder.

8. A multilayer ceramic electronic component comprising:
a ceramic main body including a dielectric layer, and first and second inner electrodes disposed to face each other with the dielectric layer interposed therebetween, wherein;
when an average thickness of the dielectric layer is td and an average thickness of the inner electrodes is te, td≤1.5 μm and 0.1 μm≤te≤0.5 μm are satisfied,
when an average surface roughness on a virtual surface roughness center line of the inner electrode is Ra and an average surface roughness of ten points of the inner electrode is Rz, 8≤Rz/Ra≤20 is satisfied, and
the average surface roughness Rz satisfies 150 nm≤Rz≤td/2.

9. The multilayer ceramic electronic component of claim 8, wherein the average thickness td of the dielectric layer and the average thickness te of the inner electrodes satisfy (td+te)/te≤2.5.

10. The multilayer ceramic electronic component of claim 8, wherein the average thickness of the dielectric layer is obtained from a section of the ceramic main body in lengthwise and thicknesswise directions cut in a central portion of the ceramic main body in a widthwise direction.

11. The multilayer ceramic electronic component of claim 8, wherein the average thickness of the inner electrodes is obtained from an average thickness of inner electrodes disposed in a central portion of a section of the ceramic main body in lengthwise and thicknesswise directions cut in a central portion of the ceramic main body in a widthwise direction.

12. The multilayer ceramic electronic component of claim 8, wherein the inner electrodes are formed of a metal powder including first particles, and second particles having a particle diameter smaller than that of first particles.

13. The multilayer ceramic electronic component of claim 12, wherein the particle diameter of the first particles is 1.5 times to 2.5 times greater than that of the second particles.

14. The multilayer ceramic electronic component of claim 12, wherein a content of the first particles is 9 to 20 weight parts based on 100 weight parts of the metal powder.

15. A method of fabricating a multilayer ceramic electronic component, the method comprising:
forming dielectric layers formed of ceramic green sheets including dielectrics;
forming inner electrode patterns on the ceramic green sheets by using a metal paste including a metal powder having first particles, and second particles having a particle diameter smaller than that of the first particles, wherein a content of the first particles is 9 to 20 weight parts based on 100 weight parts of the metal powder; and
laminating the green sheets with the inner electrode patterns formed thereon and sintering the same to form a ceramic main body, in which an average thickness te of inner electrodes satisfies 0.1 μm≤te≤0.5 μm, an average surface roughness Ra on a virtual surface roughness center line of the inner electrode satisfies 5 nm≤Ra≤30 nm, and a ratio Rz/Ra of an average surface roughness Rz of ten points of the inner electrode to the average surface roughness Ra satisfies 8≤Rz/Ra≤20.

16. The method of claim 15, wherein the particle diameter of the first particles is 1.5 times to 2.5 times greater than that of the second particles.

17. The method of claim 15, wherein an average thickness td of the dielectric layers satisfies 0.15≤td≤0.75 and (td+te)/te≤2.5.

* * * * *